UNITED STATES PATENT OFFICE.

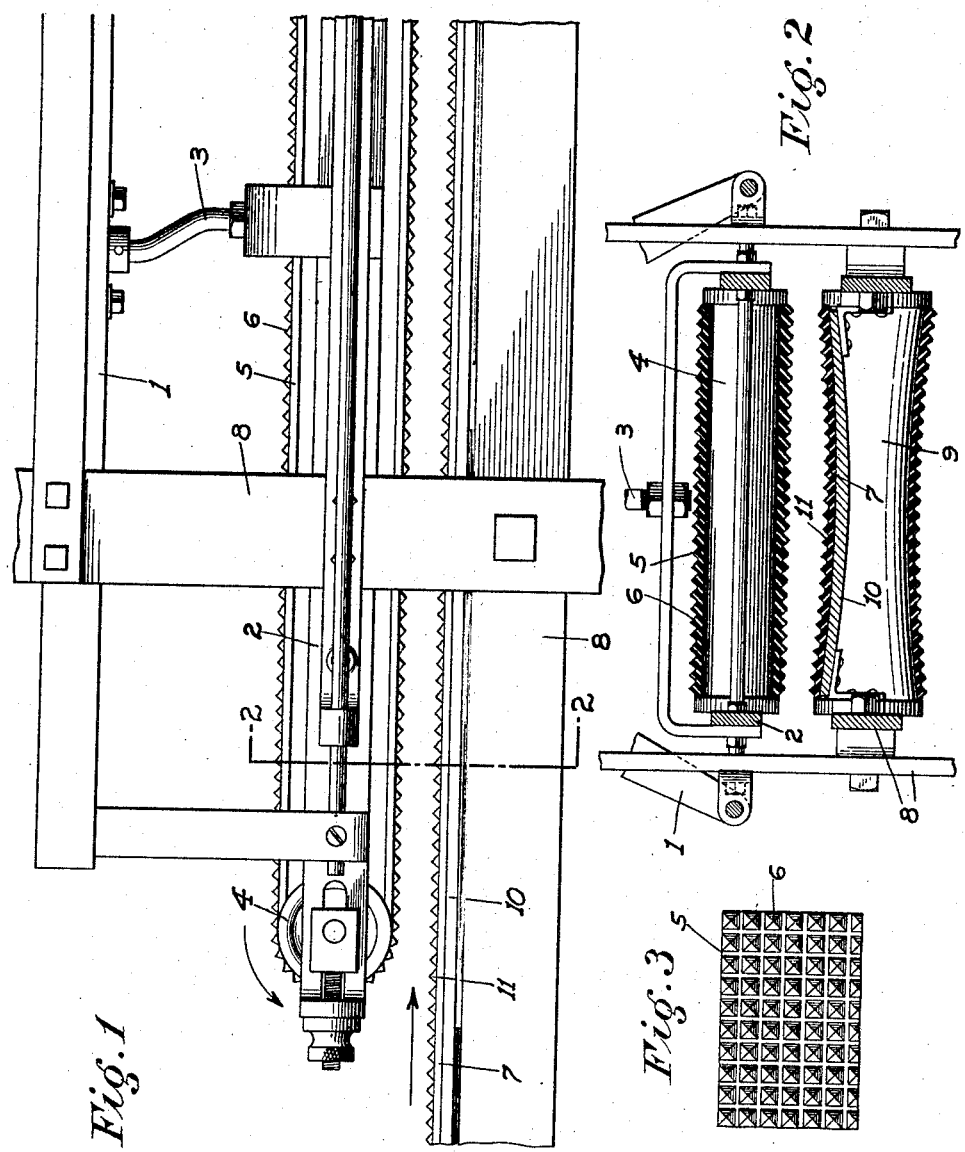

GEORGE K. BAINBRIDGE, OF RIPON, CALIFORNIA.

ROLLING-MACHINE FOR PLASTIC MATERIALS.

1,303,013.   Specification of Letters Patent.   Patented May 6, 1919.

Application filed January 9, 1919. Serial No. 270,391.

*To all whom it may concern:*

Be it known that I, GEORGE K. BAINBRIDGE, a citizen of the United States of America, residing at Ripon, in the county of San Joaquin and State of California, have invented certain new and useful Improvements in Rolling-Machines for Plastic Materials; and I do declare the following to be a clear, full, and exact description of the same, reference being had to the accompanying drawings, and to the characters of reference marked thereon, which form a part of this application.

This invention relates to improvements in rolling machines for plastic materials, particularly candy in the making, of the kind used as a filling for chocolate creams, and is more particularly an improvement on certain portions of the machine shown in Letters Patent No. 1,192,156, granted me July 25th, 1916, and to which reference is made hereinafter.

While utilizing the general principles of operation and construction as embodied in the patent above noted, the principal object of the present invention has been to provide a more positive means for gripping the plastic candy material while being rolled, and to insure that each piece of such material will travel through the machine during the rolling process at a predetermined distance from the piece preceding it.

A further object of the invention has been to so arrange the conveyer belt as used in my previous machine that it will have a cupped or concave surface so as to approximately be as close as possible to the cupped position of the hand, such means of rolling candies having been universally used in the past and having been successful in so far as that feature was concerned.

The concave belt also causes the candy material to position itself centrally of the belt when cut off after issuing from the press-outlet.

As a further object, I have provided a simple and efficient means for accomplishing the above results.

These objects, I accomplish by means of such structure and relative arrangement of the parts as will fully appear by a perusal of the following specification and claims.

On the drawings, similar characters of reference indicate corresponding parts in the several views.

Figure 1 is a side elevation of a portion of my improved candy rolling machine.

Fig. 2 is a section taken on a line 2—2 of Fig. 1.

Fig. 3 is a plan view of a fragmentary portion of the belt.

Referring now more particularly to the figures of reference on the drawings, the numeral 1 designates the rigid frame of the machine to which is mounted the conveyer belt frame 2, this frame being adapted for gyratory or circular movement in a horizontal plane in the same manner as more fully shown and described in Letters Patent No. 1,192,156, previously mentioned, this movement being transmitted thereto by a power driven eccentric arm 3. At each end of the belt frame is a roller 4, over which passes an endless driven belt 5, preferably constructed of a rubberized fabric.

The outer face of this belt is thickly set with sharp pyramid shaped teeth 6 formed integral with the belt. Positioned on a parallel plane to the belt 5 but below the same is a similar endless belt 7 mounted to an auxiliary frame 8 which is adjustable for height relative to the belt 5.

This belt 7 turns on rollers 9 which have a smaller diameter at the center than at their ends, and the upper portion of the belt lengthwise of its rollers is supported by a concave surfaced flooring 10, the belt conforming to the contour of this flooring, as shown in Fig. 2. The belt 7 is also provided with teeth 11 similar to the teeth 6, but it is especially essential that there shall be sharp teeth on the upper belt rather than on the lower. The principle of operation underlying the above described construction is as follows:—

The belt 7 travels in the same direction as the belt 5 above it, but at a considerably higher rate of speed. The lumps of candy material when cut off after issuing from the press on the machine are deposited on the lower belt and are carried along on the same at definitely spaced intervals until they come in contact with the under and outer surface of the belt 5, the two belts being spaced apart so that the distance between the tops of the protruding teeth thereon is somewhat less at the center of the belts than the height of the rough lump of candy carried by the lower belt. Consequently, as soon as the said candy lump reaches the upper belt, the sharp teeth thereon are pressed into the surface of the candy and each lump is firmly held from slipping out of its spaced position relative to the one ahead of it during the rolling process, which of course is carried out the entire length of the upper belt 5 as long as each lump remains thereunder, due to the gyratory or circular motion given to said upper belt in addition to its longitudinal movement. The rolling is aided in forming a firm solid lump of candy out of each piece of material by the concave shape of the lower belt, which causes each piece of candy to be squeezed in a smaller space than at the central position at various intervals during the rolling process, thus imitating the motion given in hand rolling when the upper palm is given the circular motion and the lower palm is cupped.

Without the sharp teeth, however, there is no chance for a grip of the candy material between the two belts, as both of them are covered with powdered sugar or similar material to prevent the sticky candy from adhering to the belts. The result is that while one such lump may be held in its proper spaced position and successfully rolled, the piece following it may slip from contact with the upper belt, and traveling faster than the one ahead of it, owing to the greater speed of the lower belt by itself compared to the retarding action of the upper belt when in contact with a candy lump, will shortly come up to and push into the lump ahead, rendering both into a shapeless mass and necessitating the stopping of the machine to clean it off.

The same trouble is had with the use of broad, blunt teeth, as these merely tend to flatten the material out instead of piercing it, and thus permit it to travel on the lower belt undisturbed, with the same ultimate result as stated in the preceding paragraph.

This difficulty I have successfully obviated by the use of sharp toothed belts, which are also better to retain a certain quantity of the powdered sugar or other substance thereon.

Thus, from the foregoing description, it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. In a rolling machine for plastic materials, an endless driven belt, another driven belt above and spaced from the same and adapted for circular movement in a horizontal plane, the first named belt having a longitudinal speed in excess of that of the last named belt, and a plurality of sharp pointed teeth on each belt whereby a piece of plastic material will be firmly gripped between the two belts and held in predetermined spaced relation to the preceding piece during the rolling process.

2. In a rolling machine for plastic materials, an endless driven belt provided with a plurality of sharp teeth and adapted for circular motion in a horizontal plane, another driven belt below the first named belt and a concave flooring under the upper portion of the last named belt, the latter following the contour of the flooring whereby the material being rolled between the two belts will be subject to a compressing movement at intervals during the rolling process.

In testimony whereof I affix my signature.

GEORGE K. BAINBRIDGE.

Copies of this patent may be obtained for five cents each, by addressing the "Commissioner of Patents, Washington, D. C."